UNITED STATES PATENT OFFICE.

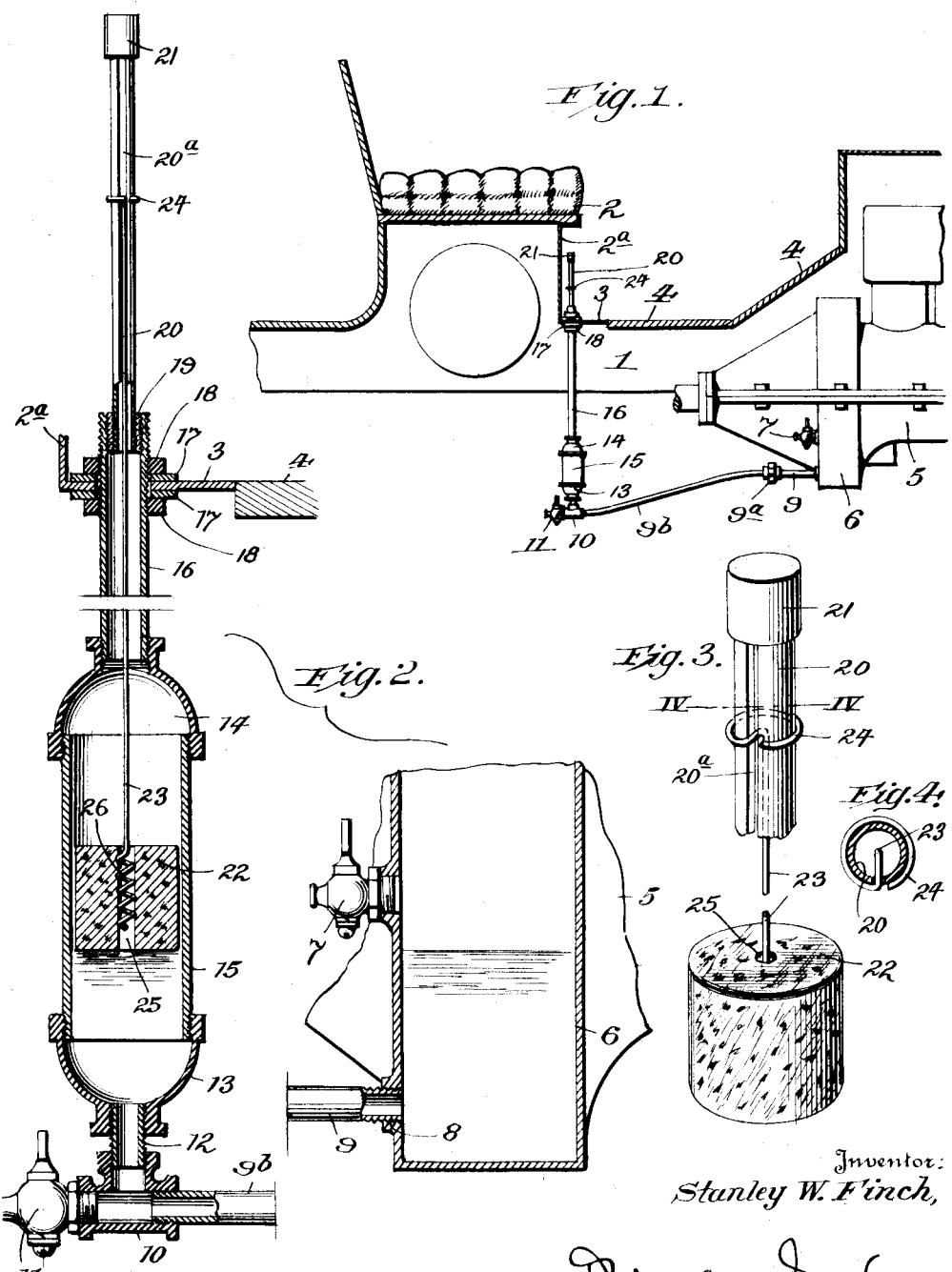

STANLEY W. FINCH, OF WASHINGTON, DISTRICT OF COLUMBIA.

LUBRICATING SYSTEM.

1,383,919.  Specification of Letters Patent.  Patented July 5, 1921.

Application filed February 4, 1921. Serial No. 442,433.

*To all whom it may concern:*

Be it known that I, STANLEY W. FINCH, a citizen of the United States, residing at Washington, District of Columbia, have invented certain new and useful Improvements in Lubricating Systems, of which the following is a specification.

This invention pertains to lubricating systems and relates more particularly to means for indicating the level of the oil in the reservoir of a splash system employed in conjunction with an internal combustion engine. The specific application of the invention, hereinafter described, is shown in connection with a Ford car and does away with the many inconveniences and uncertainties which are inherently present in such machines. Usually the Ford car is provided with two pet cocks arranged at different levels in the rear of the magneto and fly wheel housing, and, as will be readily appreciated by those who drive a Ford car, said pet cocks are somewhat inaccessible, being under the machine, and, at best, afford but an inaccurate means of testing the oil level in the housing which forms the reservoir for the lubricating oil.

The present invention has for its object the provision of means for visually indicating the oil level in the housing, said means being attachable to the car without alteration of the same other than the removal of the lowermost pet cock and the boring of a hole through the floor adjacent the seat.

The construction is illustrated in the annexed drawings, wherein,—

Figure 1 is a sectional elevation of so much of an automobile, with my indicator applied thereto, as is necessary to an understanding of my invention;

Fig. 2 a vertical sectional view of the indicator, on a somewhat larger scale;

Fig. 3 a perspective view of the float and the upper portion of the indicator proper; and Fig. 4 a transverse sectional view on the line IV—IV of Fig. 3.

In the drawings, 1 denotes the body of the car, 2 the seat, 3 the fixed portion of the floor board, 4 the floor board proper, 5 the engine housing, and 6 the well or reservoir into which the fly wheel and magneto extend and which, as above noted, is partially filled with oil and from which it is splashed or conveyed to lubricate the engine parts. The upper pet cock which may be left *in situ*, is indicated by 7, while the opening into which the usual lower pet cock is screwed is denoted by 8, Fig. 2. Screwed into said opening is a pipe 9 connected by a union $9^a$ to a second pipe or section $9^b$, the latter terminating in a fitting 10, shown as a T, and having a pet cock 11 screwed into the horizontally disposed opening opposite the connection of the pipe $9^b$. Screwed into the upper outlet of the fitting is a nipple 12 which in turn is surmounted by a float chamber, shown as composed of a lower reducing fitting 13, a similar upper fitting 14, and an intermediate section of pipe 15 of relatively large diameter. Threaded into the upper end of fitting 14 is a pipe 16, the upper end whereof is externally threaded for a considerable length, said pipe passing upwardly through an opening formed in the fixed section 3 of the floor board immediately forward of the upright wall $2^a$ of the seat support. Suitable washers 17 and lock nuts 18 are placed upon the pipe 16 and serve to hold the pipe rigidly in place with reference to the floor element 3. By forming a long thread upon the pipe 16, the pipe and its attached parts may be brought to the proper position so that the float chamber will bear its proper relation to the oil reservoir 6. Screwed into the upper end of the pipe 16 is an internally threaded bushing 19 and into which bushing there is screwed a pipe 20 which is slotted lengthwise as at $20^a$ and provided with a cap 21 at its upper end. The pipes 16 and 20 form in effect a housing for the rod, the upper portion whereof is open at one side through which the rod is exposed.

As will be seen upon reference to Fig. 1 pipe 20 stands close to the vertical wall $2^a$ and is out of the way though readily visible at all times, and particularly so as one gets in and out of the car. The movable indicator comprises a float 22, preferably formed of cork, and a wire or rod 23, the upper end whereof is bent outwardly, extending through the slot in pipe 20 and curved around the same, forming a loop 24 which is spaced away from the pipe and free to move with reference thereto. To adjustably and securely fasten the wire or rod to the float I preferably form a vertically disposed axial opening 25 therein, Fig. 2, said opening being readily produced by a burning operation, and into such opening is screwed the lower end of the rod 23. As illustrated, said end is twisted into spiral form as at 26, the convolutions whereof are of a diameter slightly greater than the diameter of the opening 25, so as to insure a binding contact between the float and the convolutions.

It is, of course, not essential that the loop 24 extend entirely around pipe 20, as it merely performs the function of an index finger and enables one to readily read the same in conjunction with marks produced upon the pipe 20, such, for instance, as a series of numerals to indicate the oil level in the reservoir 6; or notations as L, N and H, standing for low, normal and high, may be employed.

From the foregoing it will be seen that I have produced a simple and efficient indicating device and one which may be readily applied to existing machines without alteration of any of its parts other than merely boring a hole through a fixed element for the passage of a pipe, which latter affords means for fastening the structure in place as well as forming a housing for the float indicator rod. The float chamber and the other elements, excepting the float and rod, are all producible from standard fittings and pipes which renders the structure quite inexpensive.

Inasmuch as there is no relative movement between the body 1 and the engine as well as its housing 5 and reservoir 6, no strain is placed upon the pipes and fittings. The float will function at all times, rising or falling as the oil level varies.

The pipe 20 and the cap 21 being of a diameter smaller than the pipe or section 16 permits the upper nut 18 to be passed over the cap 21 and the pipe 20 so that the structure may be readily secured in position. In other words, the parts being assembled it is only necessary to pass the pipe 20 with its cap 21 and the pipe 16 upwardly through the opening in the fixed floor element 3 and then place the upper washer and nut in position and screw the nut tightly to place. The union 9ª is then coupled and the placement of the structure is complete.

What is claimed is,—

1. In combination with an oil reservoir of an internal combustion engine; a float chamber in communication with the lower portion thereof; a float in said chamber; an indicating rod extending upwardly therefrom; a housing for the rod connected with the upper end of said float chamber, the upper portion of said housing being open along one side to expose the upper portion of the rod; and means for securing said housing in place.

2. In combination with an oil reservoir of an internal combustion engine; a pipe extending from the lower portion thereof; a float chamber in communication with said pipe; a pipe extending from the upper end of said chamber; means carried by said pipe for securing it to a fixed element; a slotted member secured to said last named pipe; a float in the float chamber; and a rod, the lower end whereof is secured to the float, said rod extending upwardly from the float through the pipe and the slotted member and having its upper end bent laterally and extending outwardly through the slot.

3. In combination with a float formed of cork and having a centrally disposed opening formed therein; an indicator rod, the lower end whereof is spirally twisted and adapted to make binding contact with the wall of the opening in the float, while the upper end of the rod is fashioned into a loop lying in a plane at right angles to the axis of the rod.

4. In combination with a float; an indicating rod connected to the float at one end and having its other end fashioned into a loop lying in a plane at right angles to the axis of the rod.

5. In combination with an oil reservoir of an internal combustion engine; a pipe extending from the lower portion thereof; a float chamber in communication with said pipe; a pipe extending from the upper end of said chamber; means carried by said pipe for securing it to a fixed element; a slotted pipe secured to said last named pipe; a float in the float chamber; and a rod, the lower end whereof is secured to the float, said rod extending upwardly from the float through the last mentioned pipes and having its upper end bent laterally and extending outwardly through the slot in the slotted pipe and fashioned into a curve corresponding in form to the surface of such pipe.

In testimony whereof I have signed my name to this specification.

STANLEY W. FINCH.